US006857056B2

United States Patent
Baumeister et al.

(10) Patent No.: US 6,857,056 B2
(45) Date of Patent: Feb. 15, 2005

(54) VIRTUAL MEMORY DEVICE FOR A DIGITAL HOME NETWORK

(75) Inventors: Markus Baumeister, Aachen (DE); Steffen Hauptmann, Aachen (DE); Karin Klabunde, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/969,001

(22) Filed: Oct. 2, 2001

(65) Prior Publication Data

US 2002/0078193 A1 Jun. 20, 2002

(30) Foreign Application Priority Data

Oct. 6, 2000 (DE) .......................................... 100 49 498

(51) Int. Cl.[7] .............................................. G06F 12/00
(52) U.S. Cl. ....................... 711/170; 711/203; 709/223; 709/232
(58) Field of Search ................................. 711/170, 203; 709/223, 232; 725/82

(56) References Cited

U.S. PATENT DOCUMENTS

| 5,987,506 A | * | 11/1999 | Carter et al. ................. 709/213 |
| 6,349,352 B1 | * | 2/2002 | Lea ............................... 710/72 |
| 6,363,434 B1 | * | 3/2002 | Eytchison .................... 709/313 |
| 6,374,336 B1 | * | 4/2002 | Peters et al. ................. 711/167 |

OTHER PUBLICATIONS

Stephan Abramowski et al., "Digitale Netze in Wohnungen—Unterhaltungselektronik im Umbruch", R. Steinmetz: "Kommunikation in Verteilten Systemen (KiVS)", 11th ITG/GI Symposium Darnstadt, Mar. 1999, pp. 340–351.

* cited by examiner

Primary Examiner—Reba I. Elmore

(57) ABSTRACT

Disclosed is a network for use in a home application. In particular the network includes network nodes and a software system distributed to all the network nodes. The software system is distributed over the plurality of network nodes, and includes a virtual storage device to manage respective real storage devices of respective network nodes, wherein the virtual storage device enables storage and/or retrieval of data in the real storage devices irrespective of the type of network node.

5 Claims, 2 Drawing Sheets

VIRTUAL MEMORY DEVICE FOR A DIGITAL HOME NETWORK

Figure 1:
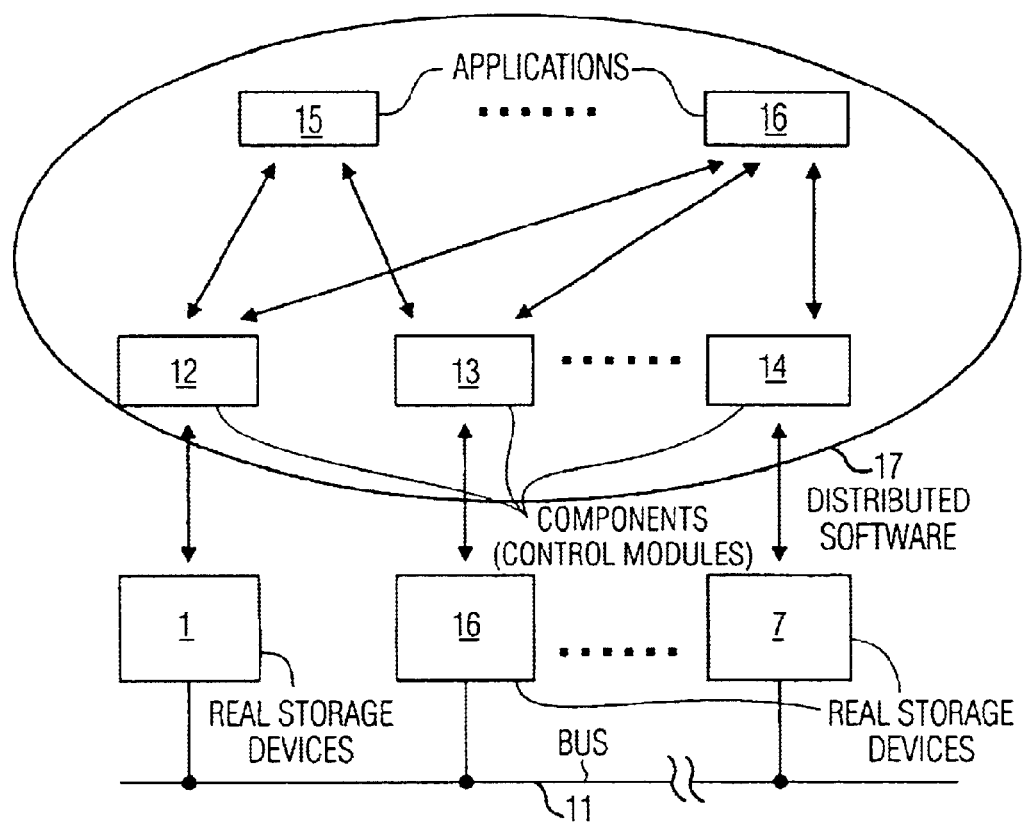

The invention relates to a network with network nodes and a software system distributed to all the network nodes.

Such a network is known from Ralph Steinmetz (publisher): "Kommunikation in verteilten Systemen (KiVS)", 11$^{th}$ ITG/GI Symposium Darmstadt, 2–5 Mar. 1999; Stephan Abramowski, Heribert Baldus, Tobias Helbich: "Digitale Netze in Wohnungen—Unterhaltungselektronik im Umbruch", pp. 340 to 351. Requirements for a future network in the home area with the software used therein are described in this publication. The newly developed digital home networks are based on the combination of a great variety of mostly digital devices and process a multitude of data of different data formats. No further details are given about the management and storage of the data in this publication.

It is an object of the invention to provide a network with a software system for enabling the user to store, file and find a widest variety of data in a simple manner.

The object is achieved by a network of the type defined in the opening paragraph in that for the real devices of the network the software system comprises a uniform, software abstraction referred to as a virtual storage device and in that the virtual storage device is provided for managing the states of all the storage devices in the network.

A generalized representation of the real devices of the network is referred to as a virtual storage device. The virtual storage device renders an abstraction available which can be offered to the user of the software system. The abstraction makes it easier for him to store, file and find all types of data. A virtual storage device is capable of storing any data in digital home networks irrespective of the devices, so that the user is guarded against the use of many heterogeneous real storage devices. The virtual storage device manages the state of all the storage devices such as, for example, accessibility of the real device and available memory capacity on its media.

The user stores his data exclusively on a virtual storage device, which takes over the allocation of the data to a real storage device. This arrangement may also be influenced by the user. The user of the virtual storage device need not pay attention to the structure of the network, the type of storage devices used and their instantaneous status with respect to the availability of free memory capacity, since these parameters are managed by the virtual storage device. If the emergency arises to insert a change medium of a storage device, the user is instructed how to do this by the virtual storage device.

To find back the stored data in the network, the user need not know on which real device his data were previously stored. Since the virtual storage device manages the contents of all the storage devices including their change media, the virtual storage device can find the desired data in the network with the aid of attributes, for example, the title. Also increased reliability is possible when respective attributes are chosen when data are stored, for example, when they are stored as replicas on various real storage devices.

For reserving system resources such as storage device or bandwidth in the network, the virtual storage device utilizes different software components. Depending on the statuses and predefined attributes for featuring the memory access such as, redundancy or a specific indication of a device, memory access conditions are processed.

Figure 2:
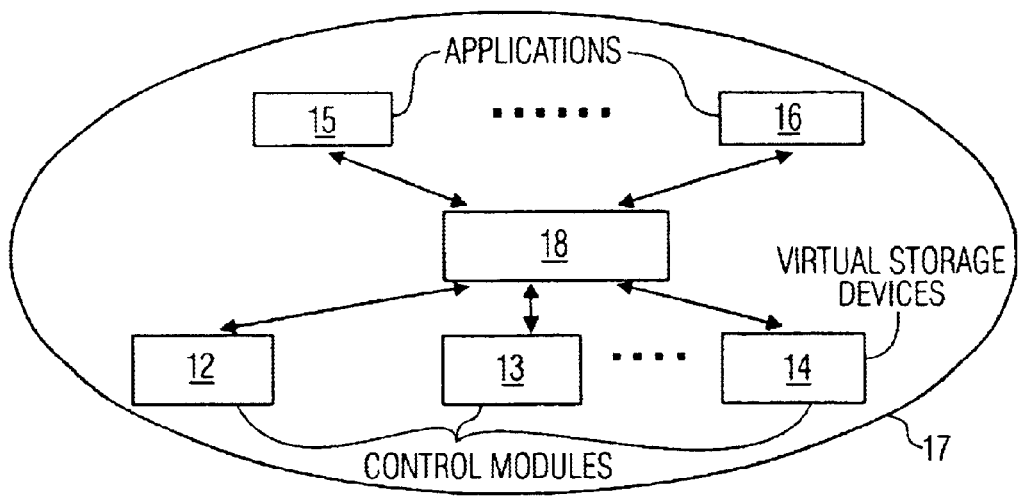
Figure 3:
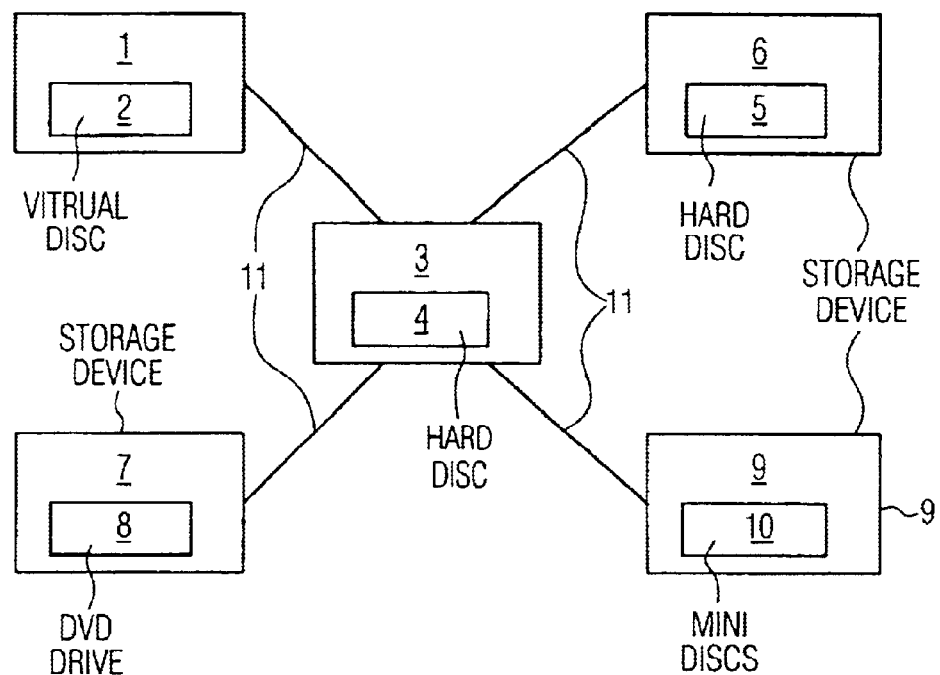

An example of embodiment of the invention will be further explained in the following with reference to a Figure, in which:

FIG. 1 shows part of a network with relevant software components without a virtual storage device, FIG. 2 shows relevant software components with a virtual storage device, and FIG. 3 shows a network comprising a plurality of storage devices which are managed by a virtual storage device.

FIG. 1 shows part of a network in the home range with a plurality of real storage devices 1, 6 and 7 which are coupled to each other by a bus system 11. A distributed software system 17 comprises in addition to many other software components the software components referred to as 12 to 14 which are relevant to the description of the invention and act as function control modules. The function control modules 12 to 14 are used as interfaces to the real storage devices 1, 6 and 7 and are used as such by various applications 15 and 16. Each application 15 and 16 is to communicate and work within the software system 17 with each function control module 12 to 14. As a result, a distinct problem arises: the larger the number of storage devices 1, 6 and 7, the more complicated storing, filing and finding of data will be both for the applications 15 and 16 and for the user of the applications 15 and 16.

In FIG. 2 not only the function control modules 12 to 14 and the applications 15 and 16 are included in the distributed software system 17, but also a software component designated virtual storage device 18. The virtual storage device 18 takes over the management of all the function control modules 12 to 14 and renders a uniform, uncomplicated memory interface available to the applications and their users.

A section of a network comprising, for example, several storage devices 1, 6, 7 and 9 is shown in FIG. 3. The storage devices shown in the Figure are an apparatus 1 for accessing an Internet with a virtual disc 2, a set top box (STB) 3 with a hard disc 4, a memory box 6 with a hard disc 5, a DVD recorder 7 with a DVD drive 8 and a minidisc recorder 9 with several minidiscs 10. A complete network would include further devices such as, for example, displays (television sets), tuners, amplifiers, CD players, CD readers/writers and much more.

For the virtual storage device is necessary the bus system 11 (for example IEEE 1394), over which all the devices can be addressed. In the example shown the real devices are interconnected in the form of a star. The topology of the bus system may then adopt all the known shapes.

The virtual storage device is realized by software running on one of the devices included in the network and forms a component part of the software architecture for digital home networks shown in FIGS. 1 and 2. This device-independent software responds to the other devices via the interfaces which, ideally, are standardized and are known as a function control module.

In the following various exemplary scenarios are described, which clarify the functionality of the virtual storage device.

A user of the home network decides to record a broadcast he is watching on television at that moment. He records it on the virtual storage device. This in turn selects an existing storage device, for example, the hard disc 4 in the STB 3 as a storage medium to record the broadcast. It is unknown a priori how long the recording will be. Therefore, the necessary storage capacity of the hard disc 4 cannot be determined beforehand. In this case the user allows a recording to run along for a very long time and the capacity of the hard disc 4 in the STB 3 is not sufficient. Since the recording is effected on the virtual storage device, the user does not notice this. The virtual storage device then automatically continues the recording on another available device such as, for example, the memory box 6 with the hard disc 5 as a storage medium.

The scenario clarifies that the user need not enter a path name on which of the various real storage devices the section is to be recorded. Furthermore, he need not think of the length of the section and of the still available storage capacity on the various devices either. If, at a later instant, the recording is accessed, name, date or other attributes are to be inputted in the virtual storage device by the user. The location of the recording or path name, respectively, or even a piecing together of the recording need not be known to the user to retrieve the recording from the virtual storage device. The data could in the mean time even be shifted within the home network by the virtual storage device for reasons of optimization.

In the second exemplary scenario the finding-back of a stored video film is described. The user would like to watch a video film recorded a long time previously. He can still roughly remember the title of the video. The virtual storage device assembles a list of titles of recordings that could correspond to the title entered by the user. The sought title is recognized by the user and chosen to be played. The virtual storage device now invites him to insert the DVD with the designated number into the DVD drive 8 of the DVD recorder 7. Then the video film is played.

This example clarifies that the virtual storage device manages the contents of all the storage devices including their change media. A recording may be found via attributes (for example, the title). The user need not know which real storage device and medium of the home network the recording was stored on.

The third example of scenario pictures the setting-up of a large music library in the home network. The user likes to listen to classical music in his spare time. Many recordings of various classical broadcasts were made by him to set up a largest possible collection of tracks of his favorite composers. All the tracks are recorded on the virtual storage device by the user. During playback of these tracks he establishes that his (often heard) favorite tracks are always played at once, whereas the playing back of rarely heard tracks is linked with a small delay. But considering the enormous collection, he can accept this.

With this scenario it becomes clear that the virtual storage device utilizes the available storage media in accordance with their properties. Often accessed recordings are stored on the high-speed memory box. Since its capacity is limited, however, rarely used audio titles are spooled to the virtual disc 2 available on the Internet. The virtual disc 2 of the Internet has a very large capacity, therefore the bandwidth for the access is clearly smaller than in the user's home network. The smaller bandwidth leads to slight delays when the titles are played back (optionally also as an alternative to a lesser quality).

The fourth example of scenario describes the function of the virtual storage device when several attributes rendered available by the virtual storage device are used. The user would like to give a colleague several pieces of music on a minidisc 10. He duplicates these pieces of music while this time he explicitly instructs the virtual storage device to store the duplicate on a minidisc. The user is then additionally to indicate whether the two minidiscs 10 played a minute ago are going to form part of the home network. Since the user would like to give the minidisc 10 to his colleague, he indicates that the minidiscs 10 are no longer part of the home network. The virtual storage device requests him first to insert one minidisc and later a second minidisc 10 into the minidisc recorder 9.

The scenario shows that physical storage devices or certain types of storage devices (here minidisc) can be addressed explicitly via the virtual storage device. If alternating memories are written then, it is ascertained whether they should remain under the management of the virtual storage device.

The fifth example of scenario explains the important function of the attributes to be given during storing. A multitude of old family pictures has been scanned into his home network by the user. They are very important memories to him. When they are stored via the virtual storage device, the user indicates that he desires them stored with high reliability. This is to protect them from a damage of the storage medium. The family pictures are of extreme importance to the user, so that these data must not be damaged or lost under any circumstances. Increased reliability is an attribute that can be selected during storing on the virtual storage device. Without further indications of the user, the virtual storage device produces two copies on independent storage devices or storage media, respectively. If, at a later instant, it should turn out that a copy is damaged, automatically the other version is used and the damaged one is set up anew. The user would not be confronted with the damage.

What is claimed is:

1. A home network comprising:
 a plurality of network nodes, wherein at least two of said nodes have different data formats; and
 a software system distributed over the plurality of network nodes, wherein the software system enables (1) a virtual storage device to manage allocation of data to respective real storage devices of respective network nodes, (2) storage and/or retrieval of data in the real storage devices irrespective of the type of network node, (3) exclusive storage of data by a user on the virtual storage device, and (4)
 a user to manage data of the different data formats without knowledge of which real storage devices the data has been stored.

2. The home network as claimed in claim 1, wherein selectable attributes are provides to be stored on the virtual storage device.

3. A home network as claimed in claim 2, wherein the virtual storage device is provided for reserving system resources via software components.

4. A home network as claimed in claim 3, wherein the virtual storage device is provided for editing memory access requirements.

5. The home network as claimed in claim 1, wherein the virtual storage device controls the allocation of data to a real storage device for the user.

* * * * *

UNITED STATES PATENT AND TRADEMARK OFFICE
CERTIFICATE OF CORRECTION

PATENT NO. : 6,857,056 B2
APPLICATION NO. : 09/969001
DATED : February 15, 2005
INVENTOR(S) : Markus Baumeister, Steffen Hauptmann and Karin Klabunde It is certified that error appears in the above-identified patent and that said Letters Patent is hereby corrected as shown below:

Col. 4, claim 1 should read as follows:

"1. A home network comprising:

a plurality of network nodes, wherein at least two of said nodes have different data formats; and a software system distributed over the plurality of network nodes, wherein the software system enables (1) a virtual storage device to manage allocation of data to respective real storage devices of respective network nodes, (2) storage and/or retrieval of data in the real storage devices irrespective of the type of network node, (3) exclusive storage of data by a user on the virtual storage device, and (4) enabling a user to manage data of the different data formats without knowledge of which real storage devices the data has been stored and providing instructions to the user to manage the data."

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,857,056 B2 | Page 1 of 1 |
| APPLICATION NO. | : 09/969001 | |
| DATED | : February 15, 2005 | |
| INVENTOR(S) | : Markus Baumeister, Steffen Hauptmann and Karin Klabunde | |

It is certified that error appears in the above-identified patent and that said Letters Patent is hereby corrected as shown below:

Col. 4, lines 33-46 claim 1 should read as follows:

"1. A home network comprising:

a plurality of network nodes, wherein at least two of said nodes have different data formats; and a software system distributed over the plurality of network nodes, wherein the software system enables (1) a virtual storage device to manage allocation of data to respective real storage devices of respective network nodes, (2) storage and/or retrieval of data in the real storage devices irrespective of the type of network node, (3) exclusive storage of data by a user on the virtual storage device, and (4) enabling a user to manage data of the different data formats without knowledge of which real storage devices the data has been stored and providing instructions to the user to manage the data."

This certificate supersedes the Certificate of Correction issued December 14, 2010.

Signed and Sealed this
Fourth Day of January, 2011

David J. Kappos
*Director of the United States Patent and Trademark Office*